United States Patent

Ninegar

[11] Patent Number: 5,613,317
[45] Date of Patent: Mar. 25, 1997

[54] MOVABLE DECOY HEAD AND NECK

[76] Inventor: Steve Ninegar, Rte. 1, Box 23, Elm Creek, Nebr. 68836

[21] Appl. No.: 259,176

[22] Filed: Jun. 13, 1994

[51] Int. Cl.$^6$ .................................................. A01M 31/06
[52] U.S. Cl. ................................................. 43/3; 446/370
[58] Field of Search ........................... 43/2, 3; 446/370, 446/372, 384, 486

[56] References Cited

U.S. PATENT DOCUMENTS

| | | | |
|---|---|---|---|
| 410,523 | 9/1889 | Jencks . | |
| 2,545,800 | 3/1951 | Viken | 43/3 |
| 2,799,961 | 7/1957 | Jaumotte | 43/3 |
| 2,885,813 | 5/1959 | Kratzert | 43/3 |
| 2,893,154 | 7/1959 | McKee | 43/3 |
| 3,557,436 | 1/1971 | Hodes | 446/370 |
| 3,800,457 | 4/1974 | Barrett | 43/3 |
| 3,916,553 | 11/1975 | Lynch et al. | 43/3 |
| 4,651,458 | 3/1987 | Lanius | 43/3 |
| 4,689,913 | 9/1987 | Brice | 43/3 |
| 4,852,288 | 8/1989 | Payne et al. | 43/3 |
| 4,896,448 | 1/1990 | Jackson | 43/3 |
| 5,199,204 | 4/1993 | Lowery | 43/3 |
| 5,279,063 | 1/1994 | Heiges | 43/3 |
| 5,289,654 | 3/1994 | Denny et al. | 43/2 |

FOREIGN PATENT DOCUMENTS

| | | | |
|---|---|---|---|
| 611844 | 11/1948 | United Kingdom | 43/2 |
| 966386 | 8/1964 | United Kingdom | 43/2 |

*Primary Examiner*—Chuck Y. Mah
*Attorney, Agent, or Firm*—John A. Beehner

[57] ABSTRACT

A wildfowl decoy is adapted for spontaneous and continuous movement in response to the wind and other external stimuli, thereby providing a realistic simulation of a wildfowl for hunting and the like. The apparatus is adapted to be utilized with a three-dimensional decoy body. The head is shaped to simulate that of a wildfowl. It has a flexible neck for connecting the head to the front portion of a body and is responsive to the impact of wind on the head and neck. The neck maybe constructed utilizing a spring or the like and may be covered with material to simulate a wild fowl neck. The neck and the head are adapted for continuous, spontaneous, three-dimensional movement in response to the wind.

8 Claims, 6 Drawing Sheets

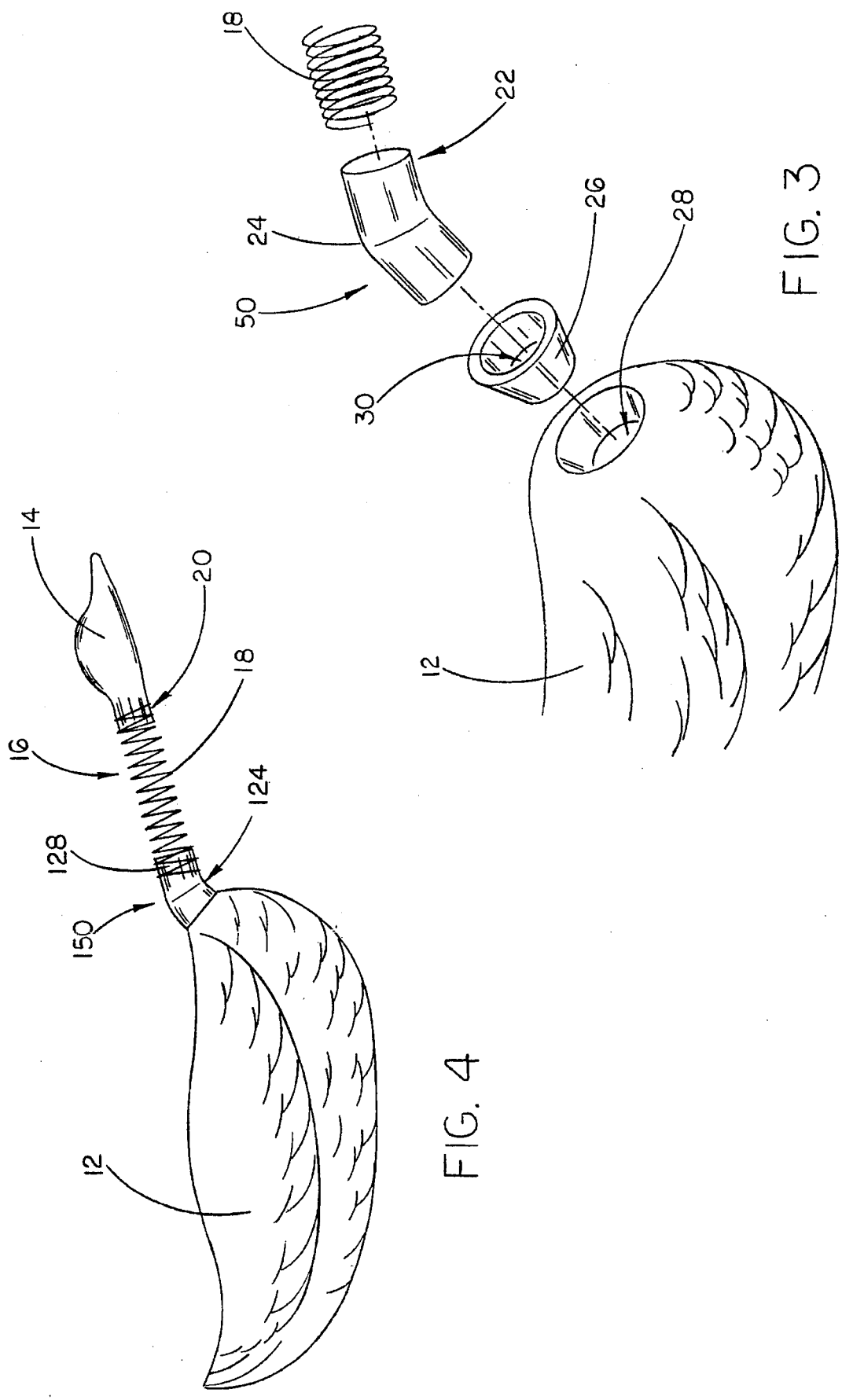

MOVABLE DECOY HEAD AND NECK

BACKGROUND OF THE INVENTION

1. Technical Field

The method and apparatus of the present invention relate generally to an apparatus and method of providing a decoy for use in hunting. More specifically, it relates to an apparatus and method for providing a flexible neck and head for use with standard decoy bodies adapted to receive interchangeable heads and necks, wherein the decoy provides realistic lifelike movements in response to wind and other external stimuli. The flexible head and neck may be utilized with an existing body or as part of a complete package.

Currently, there are numerous hunting decoys on the market. However, none of these decoys effectively simulate a live animal utilizing lifelike movement of the decoy. Obviously the more lifelike and realistic the decoy, the more effective it will be at attracting the desired animal. Consequently, it is highly desirable to have a decoy simulating lifelike movements in order to more effectively entice wildlife within hunting range.

2. Description of the Prior Art

Prior art devices for providing hunting decoys by simulating wild fowl are well known in the art. However, these prior art devices are generally limited to either motionless decoys or decoys which are capable of limited two-dimensional movement.

For example, Heiges, U.S. Pat. No. 5,279,063, discloses a wild game decoy having a "flexible" reconfigurable neck interconnecting a head and body. However, the head and neck, while being reconfigurable, must be manually manipulated into the desired position. Thus, the head and neck portions are not movable in automatic response to wind or other external stimuli. Although Heiges teaches that the decoy may be provided with flexible leg construction allowing the decoy to rock back and forth in response to wind, this would not cause the head and neck to move relative to the body. In Heiges, the head and neck are held in place by friction allowing them to retain the selected position.

Barrett, U.S. Pat. No. 3,800,457, discloses a decoy having an interchangeable head and neck which permits head and neck of different configurations to be interchanged on a single body.

Another prior art example is Pearce, U.S. Pat. No. 2,196,078, which discloses a pivotal mounting for the head of a decoy relative to its body. Pearce teaches that the head would be releasably secured to the body by means of a spring which would allow the head to be manually positioned but that would releasably secure the head in this position once placed there.

Payne et al, U.S. Pat. No. 4,852,288, is an example of a two-dimensional game decoy activated by wind. Payne discloses a head which is adapted for biasing into a neutral position but which when acted upon by the wind will pivot about an axis. However, the Payne decoy is a simple two-dimensional device adapted to be tacked on the side of a tree and therefore does not provide a very realistic simulation of wild game.

Consequently, there is a need for a realistic, three-dimensional decoy apparatus capable of spontaneous movement in response to wind or other external stimuli.

It is a further objective of the invention to provide a realistic lifelike decoy apparatus which is of sturdy construction and able therefore to withstand placement in the elements for great periods of time.

It is an objective of the present invention to provide a flexible head and neck which may be utilized with an existing decoy bodies adapted to receive interchangeable heads and necks or as part of a complete head/neck/body package.

It is a further objective of the invention to provide a decoy apparatus wherein the neck is fabricated of some flexible material having sufficient rigidity to attach the head to a body yet at the same time having sufficient flexibility that it would respond spontaneously to wind and other external stimuli creating lifelike movement.

It is another objective of the present invention to provide a covering material for the neck having a lifelike, realistic look.

It is another objective of the present invention to provide a lifelike decoy apparatus which may be constructed to resemble a variety of wildfowl including ducks, geese and the like.

It is a final objective of the invention to provide a decoy apparatus wherein the material covering the rigidity of the neck portion may be varied to adjust the tension on the neck and alter the freedom of movement thereof.

SUMMARY OF THE INVENTION

A wildfowl decoy is adapted for spontaneous and continuous movement in response to the wind and other external stimuli, thereby providing a realistic simulation of a wildfowl for hunting and the like. The apparatus is adapted to be utilized with a three-dimensional decoy body. The head is shaped to simulate that of a wildfowl. It has a flexible neck for connecting the head to the front portion of a body and is responsive to the impact of wind on the head and neck. The neck may be constructed utilizing a spring or the like and may be covered with material to simulate a wild fowl neck. The neck and the head are adapted for continuous, spontaneous, three-dimensional movement in response to the wind.

The invention also includes a method of more effectively enticing wildfowl into position for hunting or the like using an improved decoy having a flexible head and neck providing continuous and spontaneous lifelike movement in response to wind.

BRIEF DESCRIPTION OF THE DRAWINGS

FIG. 3 is an exploded perspective view showing in detail the interconnection between the neck and the body.

FIG. 4 is a side view showing in assembled configuration the head, neck, and body showing additional connection details without the neck covering.

DESCRIPTION OF THE PREFERRED EMBODIMENTS

Hunters for hundreds of years have been seeking more effective ways for tracking and hunting animals. For a large portion of this time, it has been standard practice to use decoys simulating the hunted animal under the theory that such a decoy would serve to entice the animal into close proximity with the decoy. The hunter, presumably located nearby, would then be in a better position in order to kill the animal. Obviously, the more realistic the appearance of the decoy, the better the chance of attracting the wild fowl being hunted. Consequently, it is desirable for decoys to be manufactured having extremely lifelike physical features in a never-ending attempt to more accurately simulate the wild fowl.

Prior to the inventor's disclosure herein, these attempts have mainly been directed to superficial body markings and other visual characteristics such as color and texture. With the exception of a few rather crude prior art devices, there has never been a decoy apparatus which is capable of spontaneous movement in response to wind and other external stimuli. There are currently decoy bodies on the market which are adapted to receive interchangeable head/necks, such bodies are able to utilize the inventor's flexible head/neck. Such an apparatus would then have not only a lifelike body appearance but also lifelike movement of the head and neck. The invention disclosed herein provides this lifelike decoy. Not only does it comprise lifelike markings, but even more importantly, it comprises a head and neck structure which allows flexible, spontaneous movement in response to wind and other external stimuli. It is also anticipated that a chemical scent may be applied to the apparatus to further attract wild fowl.

Figure 1:
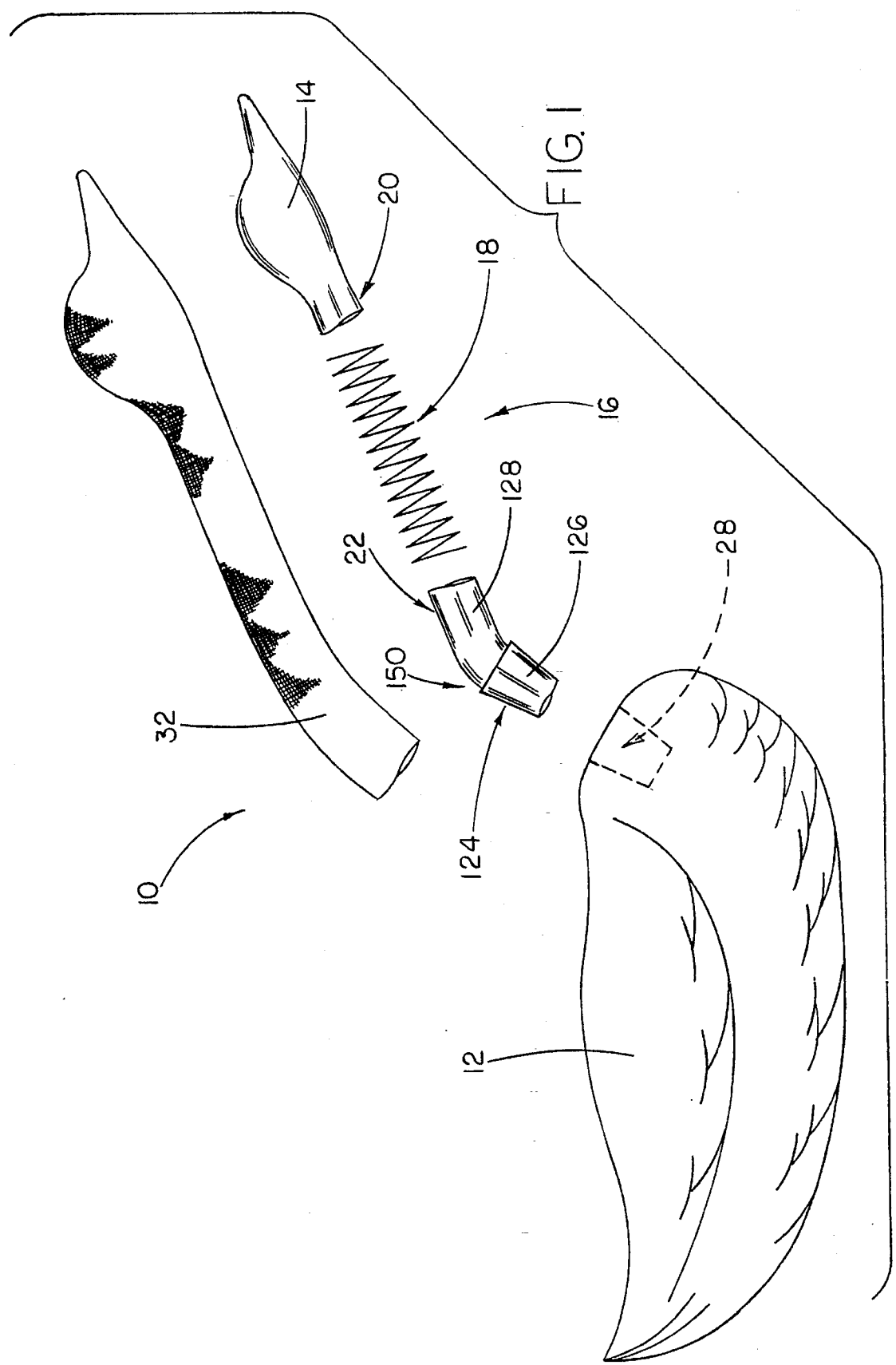
FIG. 1 is an exploded side view of a preferred embodiment of the invention showing in exploded view the interconnection of the head, neck and body.

FIG. 1 is a side view of the decoy apparatus of the present invention showing in exploded view, details of the interconnection between the head, the neck and a pre-existing conventional decoy body adapted to receive interchangeable heads and necks. As seen in the figure, head 14 is connected to body 12 by means of spring 18 and interconnection means 150. Spring 18 and interconnection means 150 in addition to covering 32 comprise neck 16. In the preferred embodiment, spring 18 is threadably or otherwise frictionally engaged with head end portion 20. In conjunction with interconnection means 150, spring 18 provides the means for the spontaneous movement of the head and neck in response to the wind and other external stimuli. Interconnection means 150 comprises plug 124 having spring interconnection end 128 and body interconnection end 126. In the preferred embodiment, the spring would be of approximately one-and-a-half-inch diameter in order to realistically simulate the neck of a duck or goose. Obviously, the size, diameter and length of the spring may be altered to accommodate different wild fowl. Additionally, springs having various degrees of tension may be used depending on the flexibility desired for the neck. The other end of the spring 18 is adapted to be threadably received on, or otherwise frictionally engaged by, spring interconnection end 128 of plug 124 of interconnection means 150. As described earlier, a preferred embodiment and method of utilizing the flexible head and neck of the present invention is with a pre-existing decoy body adapted to receive interchangeable head/necks. Therefore, body interconnection end 126 of plug 124 of interconnection means 150 is adapted to be inserted in and frictionally engaged by a pre-existing recess 28 in the forward portion of body 12. Plug 124 is adapted to provide a means for installing the flexible head and neck to an existing body as well as a means for initial manual adjustment of the head 14 and neck 16 positions in relation to body 12.

Figure 2:
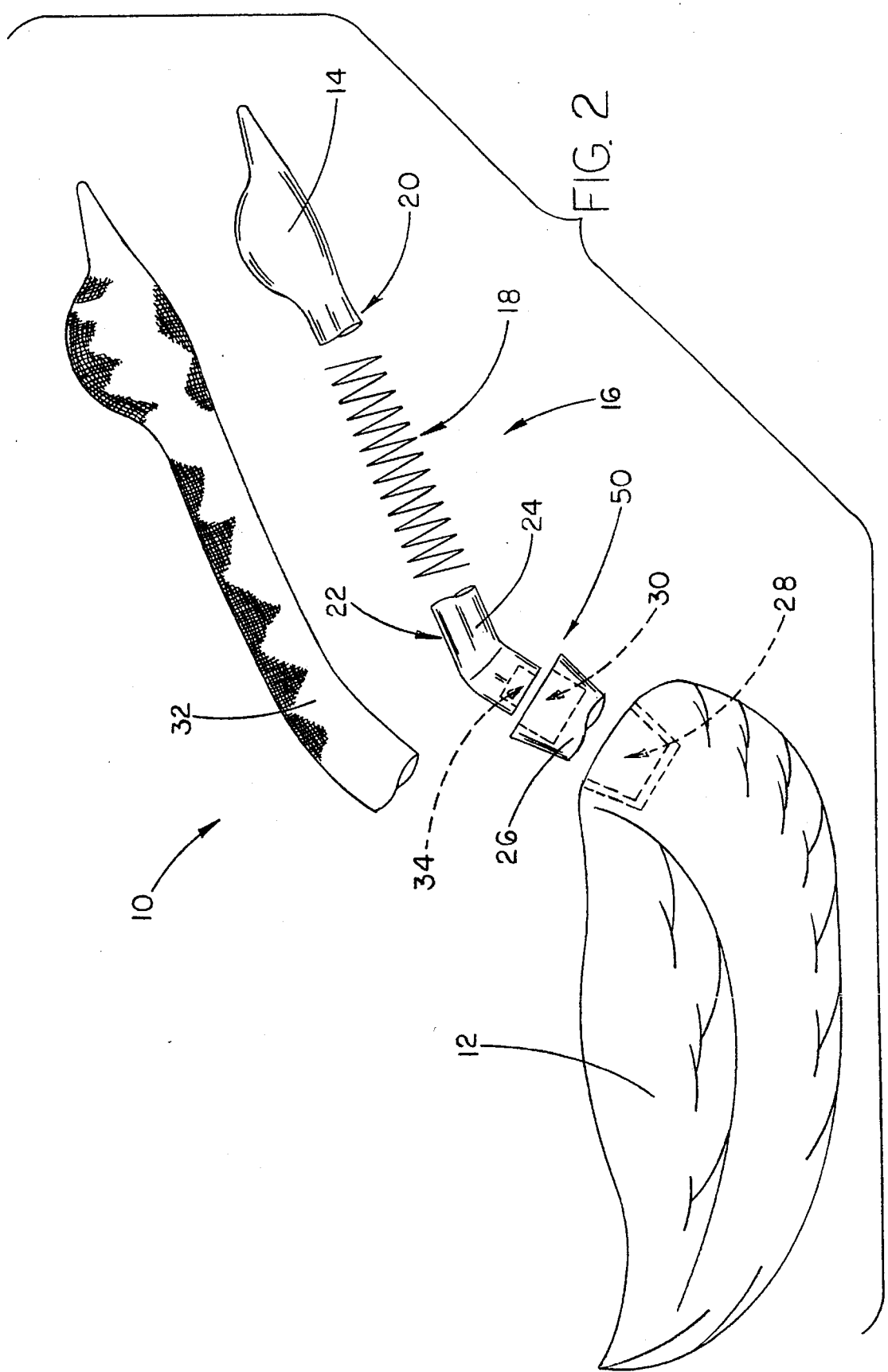
FIG. 2 is an exploded side view of an alternative embodiment of the decoy apparatus of the present invention showing in exploded view, details of the neck construction and its interconnection to the head and body.

In an alternative embodiment, an additional adapter plug 26 (FIG. 2) may be interposed between plug 24 and body 12 in order to provide a means for interfacing plug 24 with decoy bodies 12 having different sized recesses 28.

Figure 7:
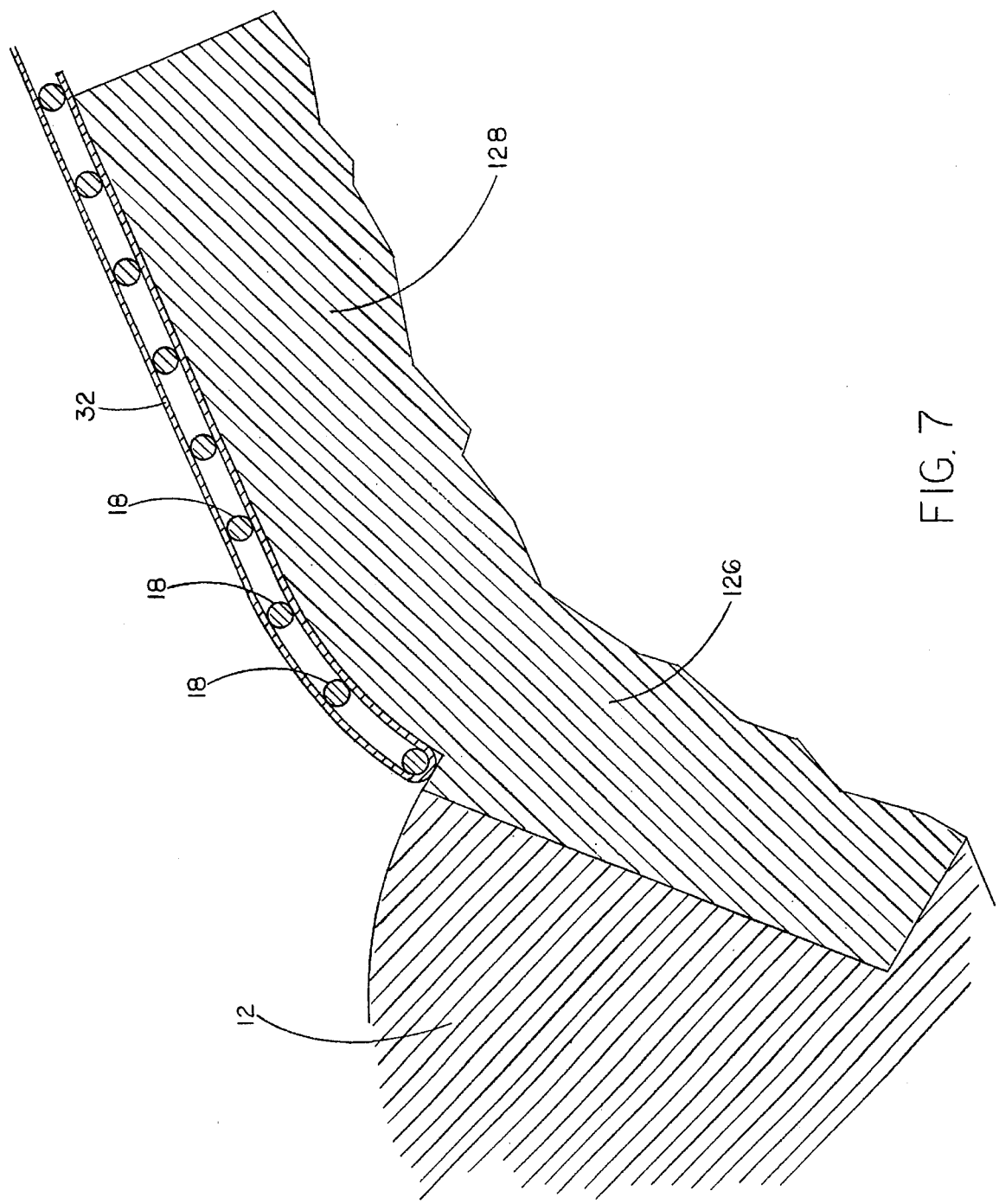
FIG. 7 is a sectional view taken along the lines shown in FIG. 6 and illustrating how excess neck covering material is received within the neck spring.

Another element of the apparatus is covering 32 for neck 16. Covering 32 is a "sock-like boot" having one open end which is adapted to be slipped over head 14 and spring 18. The loose end of covering 32 would then be tucked within the open end of spring 18 prior to its installation on the spring interconnection end 126 of plug 124 as illustrated in FIG. 7. Covering 32 would then be held in place by the frictional fit between plug 124 and spring 18. In the event adapter plug 26 is used (FIG. 2), the excess covering could be tucked within recess 34 of adaptor plug 24.

Covering 32 has both functional as well as aesthetic purposes in the invention. Aesthetically, covering 32 is required in order to hide spring 18, creating a more realistic appearance of the decoy apparatus to various wild fowl. Covering 32 is constructed of a size and material such that it conforms to the shape of head 14 maintaining the life-like appearance. Further, covering 32 may be painted or the like to appear even more life-like. Functionally, covering 32 is adapted to adjust the tension of spring 18 so as to provide a means for regulating the elasticity thereof. By pulling covering 32 tighter, spring 18 is compressed and its elasticity reduced. Loosening covering 32 expands spring 18 allowing it full movement. As mentioned above, the tension of sock 32 may be adjusted and held in place by tucking the excess portion of the sock into the open end of spring 18 (FIG. 7) or if adaptor plug 26 is used, in recess 34. Thus, covering 32, in conjunction with spring 18, provides a mechanism for adjusting the degree to which the head and neck will move in response to the wind and other stimuli. In the preferred embodiment, the covering 32 would be fabricated from lightweight material of various fabrics such as polyester, nylon, cotton or the like. With the preferred construction, covering 32 is sufficiently tight that when slipped over head 14, it assumes the shape of head 14. The head 14 and body 12 would preferably be constructed of a light weight material such as polystyrene or foam. Finally, plugs 24 and 124 of interconnection means 50 and 150 would preferably be constructed of foam or rubber. Whereas the preferred construction materials for the various components have been discussed, numerous substitute materials may be used without altering the inventive features and functions of the apparatus.

Although the figures illustrate the apparatus in the form of a duck or goose, it is anticipated that the shape of the apparatus may be altered in order to simulate numerous other types of wild fowl while still preserving the inventive features of the apparatus. Additionally, while the preferred apparatus and method of use is in conjunction with a conventional pre-existing decoy body utilizing interchangeable heads and necks, it is within the scope of this invention to provide a decoy body for use with the flexible head and neck.

FIG. 3 is a perspective view of the interconnection between the neck 16 and the body 12. The figure illustrates an alternative interconnection means 50 comprising plug 24 and adaptor plug 26 which is adapted to be received in and frictionally engaged by recess 28 in the forward portion of body 12. As mentioned previously, adaptor plug 26 can be used to interface the flexible head and neck of the present invention to decoy bodies 12 having different sized recesses 28. Additionally, plug 24 is adapted to be received in and frictionally engaged by recess 30 in adaptor plug 26. The frictional interconnection between plugs 24, 26 and body 12 allow the head and neck to be manually pre-positioned in a desired relative orientation between the head 14 and body 12.

Figure 5:
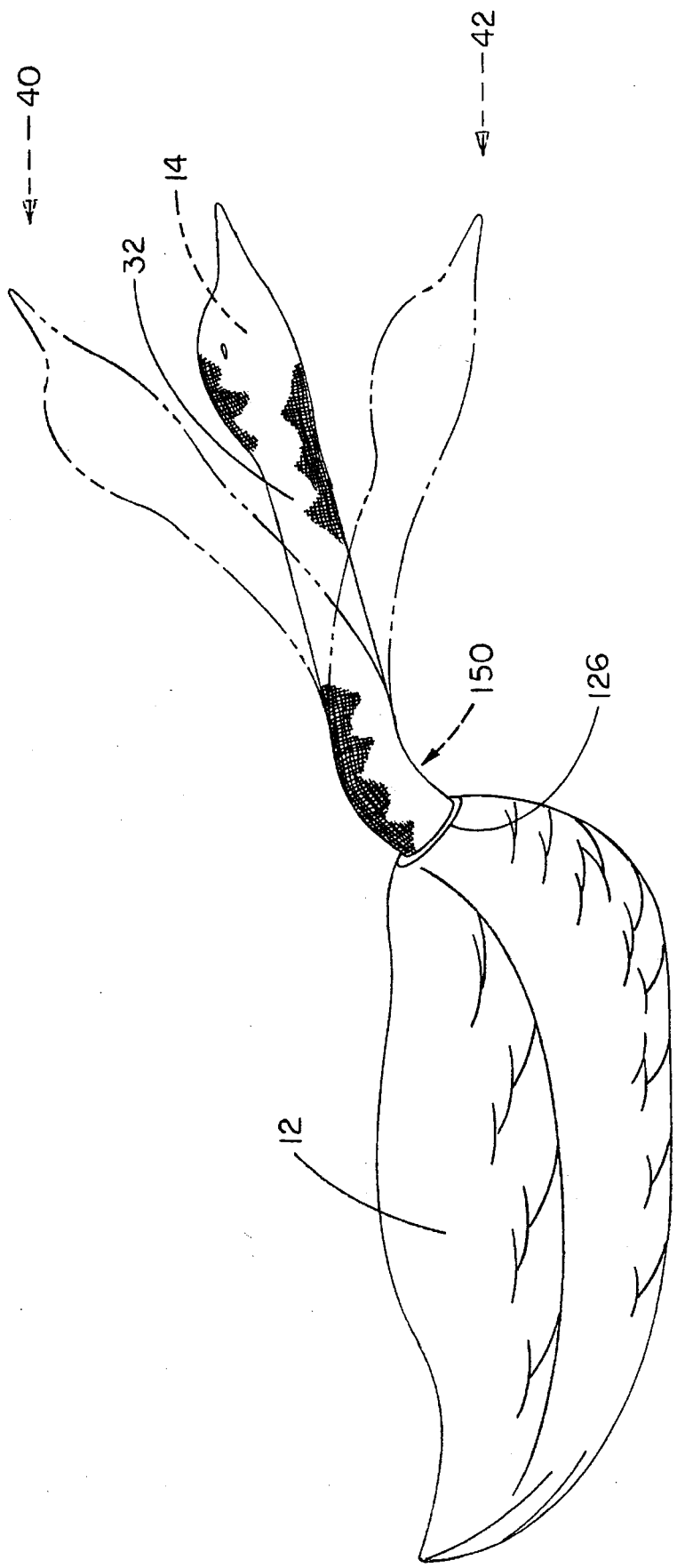
FIG. 5 is a side view showing the flexible movement of the decoy neck in the vertical plane.
Figure 6:
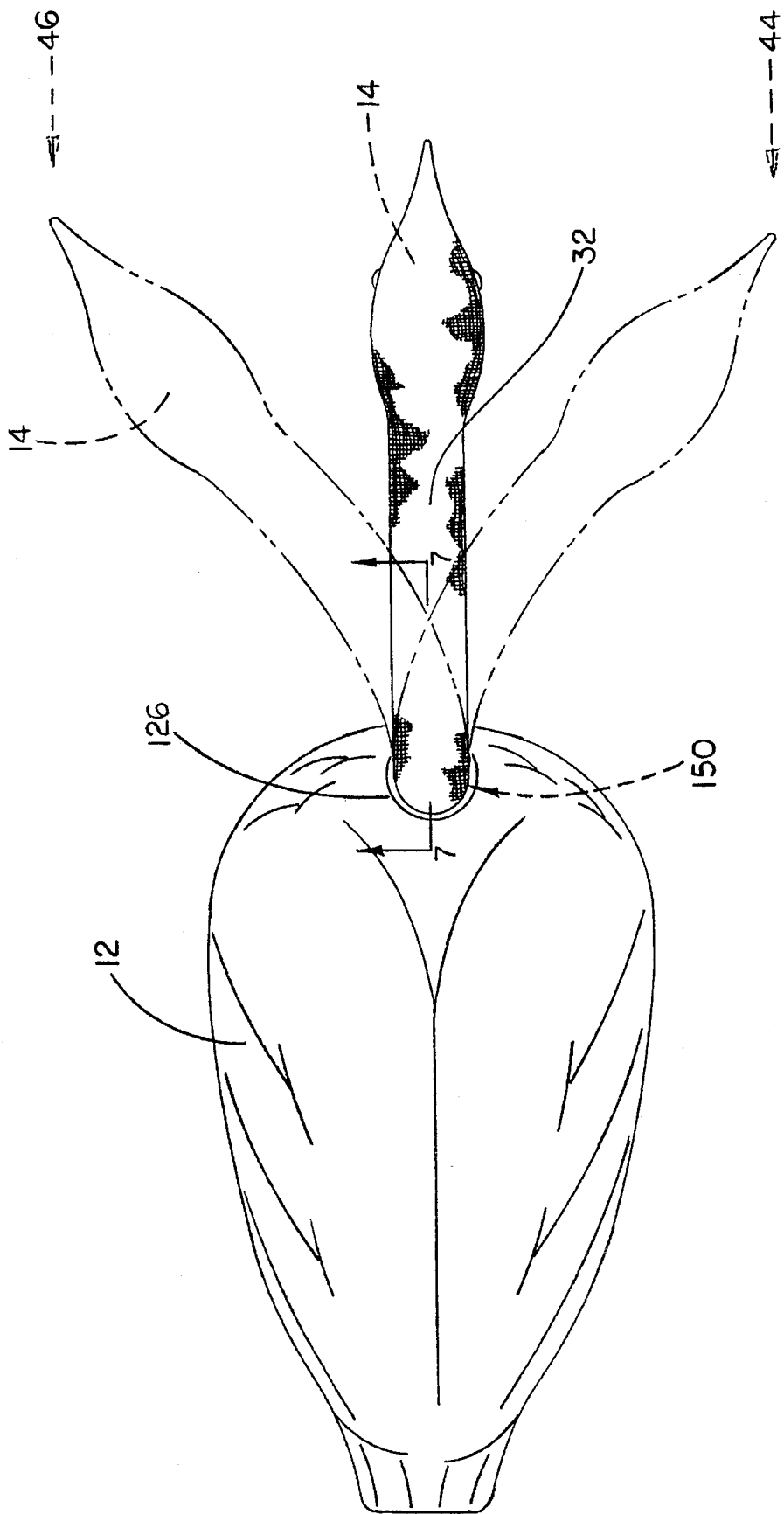
FIG. 6 is top view of the decoy apparatus of the present invention showing movement of the head and neck in the horizontal plane.

FIG. 4 is a side view of the decoy apparatus of the present invention in the fully assembled configuration without the neck covering 32 installed so as to more clearly illustrate the interconnection function provided by spring 18. As seen in the figure, spring 18 is adapted to be threadably received on, or otherwise frictionally engaged by, head end portion 20 and spring interconnection end 128 of interconnection plug 124 and thereby provides the flexibility desired for neck 16. Also shown in the figure is the reception and frictional engagement of the interconnection means 150 by body 12. FIG. 5 is a side view of the decoy apparatus of the present invention showing the movement of the head and neck in the vertical plane. As seen in the figure, the head and neck portions are continuously movable between an upper flex position 40 and a downward flex position 42. Similarly, FIG. 6 is a top view of the decoy apparatus of the present invention showing the movement of the neck and head in the horizontal plane. As seen in the figure, the neck and head are continuously movable from a left flex position 44 to a right flex position 46. The movement of the neck and head is by no means limited to the positions indicated in FIGS. 4 and 5. Rather, these figures simply serve to illustrate that the neck and head are capable of continuous movement in three dimensions relative to body 12.

As described above, FIG. 7 is a sectional view illustrating how the excess portion of covering 32 would be tucked within the open end of spring 18 and then installed on the spring interconnection end 128 of plug 124. As mentioned previously, an important feature of the present invention is the ability to adjust the elasticity of spring 18 by adjusting the tension of covering 32. Thus, covering 32 provides a means for adjusting the amount of movement in head 14 and neck 16 in response to wind and other external stimuli. For example, to decrease the response of head 14 and nick 16, covering 32 could be tightened. To increase the response, covering 32 could be loosened. In either case, the excess covering would be tucked into the open end of spring 18 prior to its installation on plug 124.

It is obvious that numerous other modifications and variations of the present invention are possible in view of the above teachings. For example, a major modification to the apparatus, which has already been discussed, is the use of different shapes and sizes for the head and neck portions in order to simulate different species of wild fowl. Additionally, the flexible neck/head may be provided with an additional adaptor plug in order to allow it to interface with "nonstandard" bodies. Further, the flexible neck/head may be utilized on conventional decoy bodies implementing interchangeable head/necks or it may be part of a complete head/neck/body package. Another important modification discussed above is the elasticity of the spring used to simulate the neck. By increasing or decreasing the elasticity of the spring, the flexibility and resulting movement of the head and neck, as the result of wind and external stimuli, may be altered. Finally, the construction material for the neck covering and the tension of its securement to the head and interconnection means may be adjusted to vary the flexibility of the neck.

Therefore, it is to be understood that the above description is intended in no way to limit the scope of protection of the claims and is representative of only one of several possible embodiments of the present invention. Thus, there has been shown and described an invention which accomplishes at least all the stated objectives.

I claim:

1. A wildfowl decoy head and neck adapted for spontaneous and continuous movement in response to the wind and other external stimuli, thereby providing a realistic simulation of a wildfowl for hunting and adapted to be installed on conventional three dimensional decoy bodies permitting an interchangeable head and neck, the flexible head and neck comprising:

a three-dimensional head shaped to simulate said wildfowl;

a flexible neck operative for connecting said head to a three-dimensional decoy body and responsive to the impact of wind on said head and neck, said neck comprising a spring covered with material;

interconnection means for connecting said flexible neck and said body; and said decoy body having a recess for receiving said three-dimensional head and neck and said interconnection means being a plug of a size and shape to receive and support said neck spring and to frictionally fit into said recess such that, upon connection of said neck to said body and placement in the wind, said neck and said head are adapted for continuous, spontaneous three-dimensional lifelike movement in response to said wind.

2. The decoy apparatus of claim 1 wherein said cover material is polyester, cotton, or nylon.

3. The decoy apparatus of claim 1 wherein said wildfowl is a duck.

4. The decoy apparatus of claim 1 wherein said wildfowl is a goose.

5. The decoy apparatus of claim 1 wherein said head and body are constructed of polystyrene, foam, or plastic.

6. The decoy apparatus of claim 1 wherein said apparatus is chemically scented to attract wildfowl.

7. A wildfowl decoy head and neck adapted for spontaneous and continuous movement in response to the wind and other external stimuli, thereby providing a realistic simulation of a wildfowl for hunting and adapted to be installed on conventional three dimensional decoy bodies permitting an interchangeable head and neck, the flexible head and neck comprising:

a three-dimensional head shaped to simulate said wildfowl; and a flexible neck operative for connecting said head to a three dimensional decoy body and responsive to the impact of wind on said head and neck, said neck comprising a spring covered with material;

an interconnection means for connecting said flexible neck and said body, said interconnection means comprising a mounting plug adapted to receive and fictionally engage said neck spring and an adapter plug adapted to receive and fictionally engage said mounting plug and wherein said body comprises a recess at the forward portion thereof adapted to receive and fictionally engage said adapter plug such that said neck and said head are adapted for continuous, spontaneous three-dimensional lifelike movement in response to said wind.

8. A method of more effectively enticing wildfowl into position for hunting using an improved decoy having a flexible head and neck providing continuous and spontaneous lifelike movement in response to wind comprising:

providing
- a wildfowl decoy body permitting an interchangeable head and neck, the body having a recess at the forward end thereof for receiving a flexible neck;
- a three-dimensional head shaped to simulate said wildfowl;
- a flexible neck connecting said body and said head and responsive to the impact of wind on said head and neck such that said neck and said head are adapted for continuous, spontaneous three-dimensional lifelike movement in response to said wind, the neck having a plug adapted to be received within said body recess, the neck further having a spring with opposite first and second open ends, said first open end adapted to engage said head, and wherein said head and neck further comprise a covering adapted to cover said head and neck;

installing said flexible head and neck on said decoy body including adjusting the tension of said neck spring and the tightness of said covering by pulling said cover, inserting said cover in said spring second end, inserting said plug in said spring second end, and inserting said plug in said body recess; and placing said decoy with said flexible head and neck in a hunting environment.

* * * * *